United States Patent
Uwazumi et al.

(10) Patent No.: US 6,667,117 B2
(45) Date of Patent: Dec. 23, 2003

(54) PERPENDICULAR MAGNETIC RECORDING MEDIUM AND A MANUFACTURING METHOD FOR THE SAME

(75) Inventors: Hiroyuki Uwazumi, Nagano (JP); Yasushi Sakai, Nagano (JP); Toyoji Ataka, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 110 days.

(21) Appl. No.: 09/802,176

(22) Filed: Mar. 8, 2001

(65) Prior Publication Data

US 2001/0038932 A1 Nov. 8, 2001

(30) Foreign Application Priority Data

Apr. 6, 2000 (JP) ........................ 2000-105474

(51) Int. Cl.⁷ .................. G11B 5/667; G11B 5/66; G11B 5/70
(52) U.S. Cl. .................. 428/694 TS; 428/694 TM; 428/694 TP; 428/900
(58) Field of Search ............... 428/694 TS, 694 TM, 428/900, 611, 668, 694 TP

(56) References Cited

U.S. PATENT DOCUMENTS

| | | | |
|---|---|---|---|
| 4,828,919 A | | 5/1989 | Kitakami et al. ............ 428/336 |
| 5,815,342 A | * | 9/1998 | Akiyama et al. ......... 360/97.01 |
| 5,872,690 A | * | 2/1999 | Tadokoro et al. ............ 360/113 |
| 5,942,342 A | * | 8/1999 | Hikosaka et al. ........ 428/694 R |
| 6,195,239 B1 | * | 2/2001 | Araki et al. ............ 360/324.11 |
| 6,424,507 B1 | * | 7/2002 | Lederman et al. ...... 360/324.11 |
| 6,534,203 B2 | * | 3/2003 | Iwasaki et al. ........... 429/694 T |
| 2001/0051288 A1 | * | 12/2001 | Iwasaki et al. ....... 428/694 TM |

FOREIGN PATENT DOCUMENTS

| | | |
|---|---|---|
| JP | 62-214426 | 10/1985 |
| JP | 61-278013 | 12/1986 |
| JP | 62-121924 | 6/1987 |
| JP | 63-302415 | 12/1988 |
| JP | 06180834 | 6/1994 |
| JP | 10214719 | 8/1998 |
| WO | WO 00/07181 | 2/2000 |

OTHER PUBLICATIONS

Derwent Accession No. 89–028331 (Abstract for JP 63–302415).
Derwent Accession No. 87–193976 (Abstract for JP 62–121924).
Derwent Accession No. 87–019059 (Abstract for JP 61–278013).
Derwent Accession No. 85–307450 (Abstract for JP 60–214426).

* cited by examiner

*Primary Examiner*—Holly Rickman
(74) *Attorney, Agent, or Firm*—Darby & Darby

(57) ABSTRACT

A perpendicular magnetic recording medium is formed of a soft magnetic layer, an anti-ferromagnetic layer, a magnetic recording layer, a protective layer, and a liquid lubricant layer deposited in that order on a non-magnetic substrate. The anti-ferromagnetic layer is a Mn alloy containing at least Co at 10 atomic % or greater and 50 atomic % or less or a Mn alloy containing at least Ir at 10 atomic % or greater and 30 atomic % or less. A radial magnetic field is applied during formation of the anti-ferromagnetic layer and the soft magnetic layer. Exchange coupling with the anti-ferromagnetic layer controls magnetic domain walls of the soft magnetic layer. The need for heat treatment after film formation is eliminated.

9 Claims, 4 Drawing Sheets

PERPENDICULAR MAGNETIC RECORDING MEDIUM AND A MANUFACTURING METHOD FOR THE SAME

BACKGROUND TO THE PRESENT INVENTION

The present invention relates to a perpendicular magnetic recording medium that is mounted onto various magnetic recording devices and a manufacturing method for the same.

Instead of the longitudinal magnetic recording system of the prior art, a perpendicular magnetic recording system has been gathering attention as a technique for increasing densities of magnetic recordings. A perpendicular magnetic recording medium is constructed from a magnetic recording layer of a hard magnetic material and a backing layer of a soft magnetic material. The backing layer has the function of concentrating the magnetic flux that is generated by the magnetic head that is used in recording to the recording layer. Among the noises that are of concern in a perpendicular recording medium with this structure, spike noise is known to be a result of a magnetic domain wall formed in the soft magnetic layer that is the backing layer. As a result, in order to have reduced noise in the perpendicular magnetic recording medium, there is a need to prevent the magnetic domain wall formation in the soft magnetic layer.

As shown in Japanese Laid Open Patent Publication Number 6-180834 and Japanese Laid Open Patent Publication Number 10-214719 for example, a method is proposed for controlling the magnetic domain wall of this soft magnetic layer, wherein a ferromagnetic layer of a Co alloy or the like is formed as a top layer or bottom layer of the soft magnetic layer. The ferromagnetic layer is magnetized in the desired direction. Another proposed method forms an anti-ferromagnetic thin film. The exchange coupling fixes the magnetization of the soft magnetic layer.

OBJECT AND SUMMARY OF THE INVENTION

With the method that uses an anti-ferromagnetic layer and controls the magnetic domain wall by exchange coupling with the soft magnetic layer, when adequate exchange coupling is achieved, the magnetic domain wall formation of the soft magnetic layer is prevented and is extremely effective. However, as indicated in Japanese Laid-open Patent Publication Number 10-214719 for example, in order to have adequate exchange coupling, after forming the film, heat treatment is necessary. This is extremely disadvantageous for mass production.

The object of the present invention is to provide a perpendicular magnetic recording medium having an anti-ferromagnetic layer that prevents magnetic domain wall formation of the soft magnetic layer. A further object of the present invention is to provide a manufacturing method for this perpendicular magnetic recording medium whereby mass production is conducted easily.

Intensive study was conducted on how to control the magnetic domain wall of the soft magnetic layer effectively by using an anti-ferromagnetic layer and on how to have a process design suitable for mass production. As a result, for the anti-ferromagnetic layer that is formed between the non-magnetic substrate and soft magnetic layer, the use of an Mn alloy containing at least Co at 10 atomic % or greater and 50 atomic % or less, or the use of an Mn alloy containing at least Ir at 10 atomic % or greater and 50 atomic % or less was discovered to be effective. Furthermore, it was determined that additional effectiveness could be obtained using an amorphous Co alloy as the soft magnetic layer.

When manufacturing this magnetic recording medium, a magnetic field of 796 A/m (10 Oe) or greater is applied in the radial direction of the substrate during the film formation of at least the anti-ferromagnetic layer and the soft magnetic layer. This produces a suitable amount of exchange coupling without requiring heat treatment or the like after film formation. The domain walls of the soft magnetic layer is effectively controlled.

The above, and other objects, features, and advantages of the present invention will become apparent from the following description read in conjunction with the accompanying drawings, in which like reference numerals designate the same elements.

DESCRIPTION OF THE PREFERRED EMBODIMENTS

Figure 1:
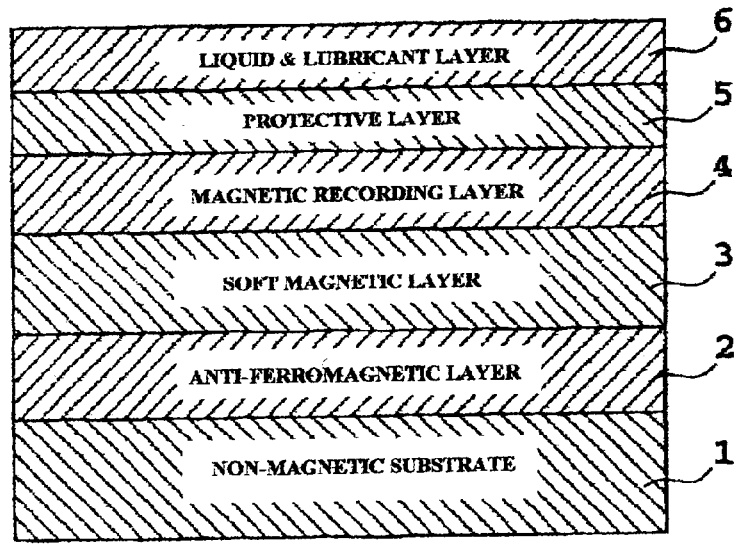
FIG. 1 is a cross-section model diagram showing a structure of a magnetic recording medium according to the present invention.

Referring to FIG. 1, a cross-section model diagram of a perpendicular magnetic recording medium of the present invention is shown. At least an anti-ferromagnetic layer 2, a soft magnetic layer 3, a magnetic recording layer 4, and a protective layer 5 are formed in that order on top of a non-magnetic substrate 1. A liquid lubricant layer 6 is deposited atop the foregoing.

For non-magnetic substrate 1, an Al alloy with NiP plating or tempered glass or crystallized glass, and the like can be used. The shape can be any useful shape including a disk-shape (a circular shape with a circular hole in the center part) as used for the usual magnetic recording medium. A ferromagnetic material of an alloy containing at least Co and Cr is suitable for use for magnetic recording layer 4. In order to be used as a perpendicular magnetic recording medium, the c-axis of its hexagonal close-packed structure must be oriented perpendicular to the film surface. In order to control the crystal orientation and crystal size of magnetic recording layer 4 favorably, an undercoat layer (not shown) of a Ti or TiCr alloy for example can be placed between soft magnetic layer 3 and magnetic recording layer 4. For protective film 5, a thin film with a main component of carbon is used. In addition, for liquid lubricant layer 6, for example, a perfluoropolyether lubricant can be used.

Anti-ferromagnetic layer 2 is constructed from an Mn alloy containing at least Co at 10 atomic % or greater and 50 atomic % or less (in other words, $Co_{10-50}Mn_{50-90}$), or an Mn alloy containing at least Ir at 10 atomic % or greater and 30 atomic % or less (in other words, $Ir_{10-30}Mn_{70-90}$). Other metals (for example at around 5 atomic %) can be added to this CoMn alloy and IrMn alloy as long as they do not negatively impact the anti-ferromagnetic layer properties. In contrast with the PdMn, PtMn, NiMn alloys described in Japanese Laid-Open Patent Publication Number 10-214719, by using the CoMn alloy or IrMn alloy of the present invention, heat treatment after film formation is unnecessary. The magnetic domain wall formation of the soft magnetic layer is controlled or, in other words suppressed, solely by the magnetic field applied during film formation. As a result, the production properties of the perpendicular magnetic recording medium is greatly improved. The film thickness of anti-ferromagnetic layer 2 is not limited, but in order to have a suitable degree of exchange coupling and in order to be suitable for mass production, a thickness of around 5 nm~30 nm is preferred. Furthermore, in order to control the film structure of anti-ferromagnetic layer 2, a thin film for structural control, for example a Cu film or the like, can be formed between non-magnetic substrate 1 and anti-ferromagnetic layer 2.

For soft magnetic layer 3, NiFe alloy, Sendust (FeSiAl) alloy and the like can be used, but the use of an amorphous Co alloy is preferred. By adding Zr, Nb, Ta, Hf, Ti, and/or W to the Co, an amorphous Co alloy is obtained. Amorphous alloys that are suitable for use in the present invention include CoZrNb, CoZrHf, and CoHfTa, and the like. CoZrNb is particularly preferred. When using CoZrNb, the effectiveness of the present invention, in other words, the effectiveness in controlling the magnetic domain wall of the soft magnetic layer, is maximized. When using CoZrNb alloy in the present invention, it is preferable to have 5~20 atomic % of Zr and 3~15 atomic % of Nb. The optimal value for the film thickness of soft magnetic layer 3 changes depending on the structure and properties of the magnetic head that is used for recording, but from the standpoint of being compatible with production, it is preferable to have a thickness of 10 nm or greater and 300 nm or less.

In the manufacture of the magnetic recording medium having the layer structure as described above and as is shown in FIG. 1, techniques of vacuum deposition, sputtering, CVD methods and the like is used for the film formation of each of the component layers except the liquid lubricant layer. Among these, the sputtering method is preferred. Furthermore, for the coating of the liquid lubricant layer, the coating technology of dipping or spin coating or a spraying technology and the like can be used.

Figure 2:
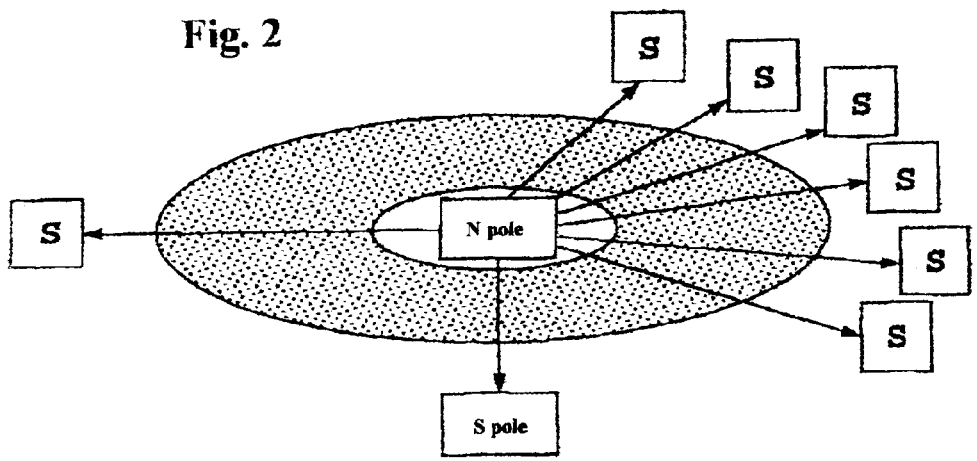
FIG. 2 is a model diagram showing the magnetic field being applied in the radial direction of the substrate.
Figure 3:
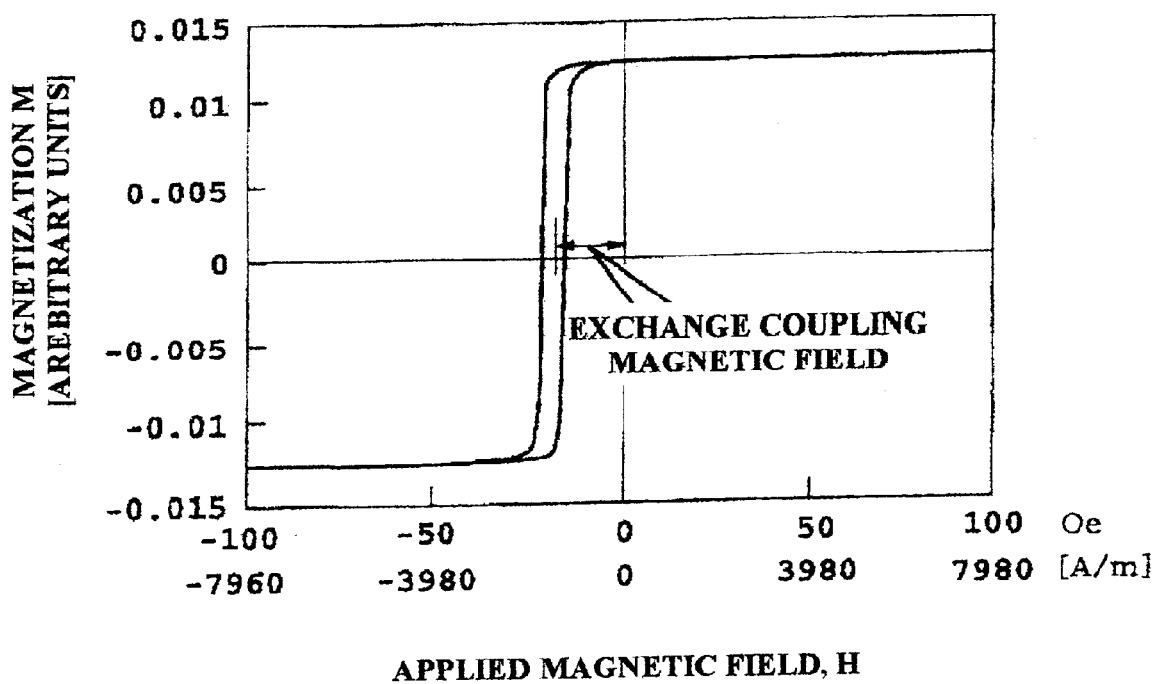
FIG. 3 shows the magnetization curve showing the definition of exchange coupling magnetic field.

However, when manufacturing the perpendicular magnetic recording medium of the present invention, at least anti-ferromagnetic layer 2 and soft magnetic layer 3 must be formed while applying a magnetic field. For example referring to FIG. 2, formation of anti-ferromagnetic layer 2 and soft magnetic layer 3 must be conducted while applying a magnetic field of 796 A/m (10 Oe) or greater in the radial direction of non-magnetic substrate 1. By this, the magnetism of anti-ferromagnetic layer 2 is fixed in the radial direction of the non-magnetic substrate (henceforth referred to as substrate radial direction). The axis of easy magnetization of soft magnetic layer 3, which is formed next, is also oriented in the radial direction of the non-magnetic substrate. As a result, effective control of the magnetic domain wall, or in other words the prevention of a magnetic domain wall, is attained. This type of magnetic field is generated, for example, by a solenoid coil that is placed above and/or below the laminated surface of the substrate. When using a magnetron sputtering method for film formation, the magnet to be used is adjusted so that the leakage magnetic field from the target has a specified direction and strength at the substrate surface. From the standpoint of controlling the magnetic domain wall, there is no upper limit to the strength of the applied magnetic field, but when an extremely strong magnetic field is applied during film formation, there is fear that there may be some problems in film formation by sputtering. As a result, the applied magnetic field is preferably around 23900 A/m (300 Oe) or less.

The embodiments of the present invention are described below.

[Embodiments 1~2]

A chemically tempered glass substrate that has a smooth surface (for example N-10 glass substrate manufactured by Hoya Co.) was used as non-magnetic substrate 1. After rinsing, this was placed inside a sputter device. Using a CoMn alloy target with a changing Co amount (Embodiment 1) or an IrMn alloy target with a changing Ir amount (Embodiment 2), anti-ferromagnetic layer 2 with various compositions was formed at a thickness of 30 nm. Next, using a $Co_{85}Zr_{10}Nb_5$ target, an amorphous CoZrNb soft magnetic layer 3 was formed at a thickness of 200 nm on top of anti-ferromagnetic layer 2. For the formation of these layers, a DC magnetron sputtering method under a 0.67 Pa (5 mTorr) Ar gas pressure was used. In addition, the magnet of the magnetron sputtering device was adjusted, and the formation of these layers was conducted while applying a magnetic field of 2390 A/m (30 Oe) in the radial direction of the non-magnetic substrate.

The sample used for measuring the exchange coupling magnetic field described later was removed from the sputter device at this time.

When manufacturing the perpendicular recording medium, after forming soft magnetic layer 3, without removing from inside the sputter device, this was next heated by a lamp heater until the surface temperature of the fixed magnetization laminate reached 250 degrees C. Afterwards, using a Ti target, a Ti undercoat film of thickness 10 nm was formed. Next, using a $Co_{70}Cr_{20}Pt_{10}$ target, a CoCrPt magnetic recording layer 4 of thickness 30 nm was formed. Finally, after using a carbon target to form protective layer 5 of carbon with a thickness of 10 nm, the intermediate product was removed from the vacuum device. The film formations were all conducted under an Ar gas pressure of 0.67 Pa (5 mTorr) and by a DC magnetron sputtering method. Afterwards, liquid lubricant layer 6 of perfluoropolyether of a thickness of 2 nm was formed by dip method. The final product is the perpendicular magnetic recording medium.

Figure 4:
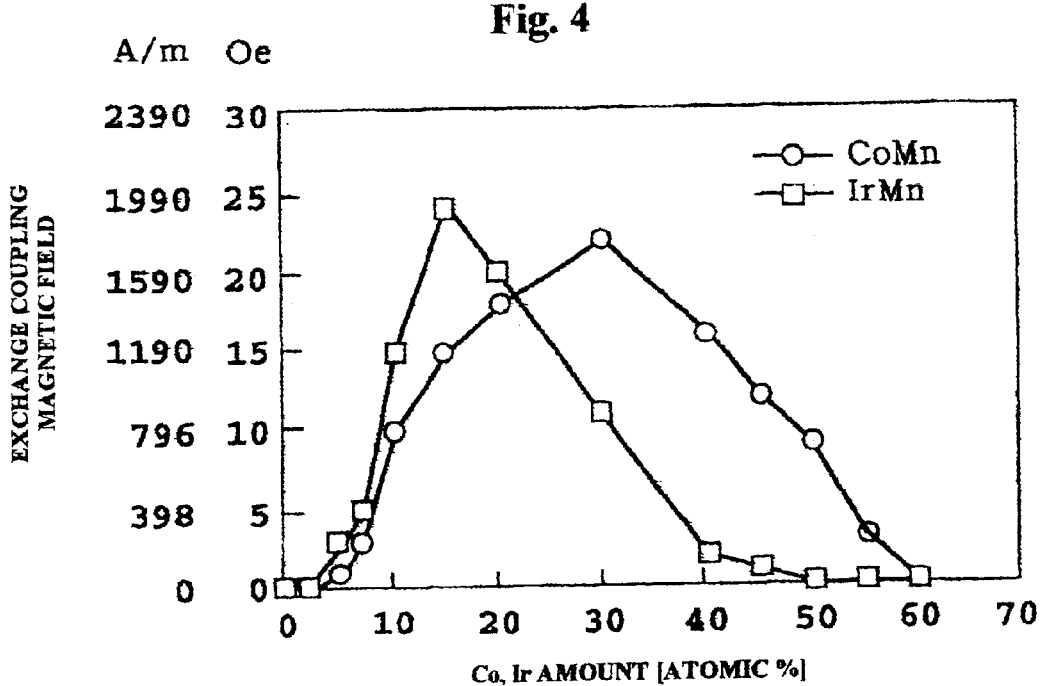
FIG. 4 is a graph showing the change in the value of the exchange coupling magnetic field with respect to the composition of CoMn and IrMn anti-ferromagnetic layer.

With the sample that was removed from the sputter device without forming the undercoat layer, magnetic recording layer 4, protective layer 5, and liquid lubricant layer 6, the magnetization curve in the substrate radial direction was measured by a vibrating sample magnetometer. In other words, the exchange coupling magnetic field is the average value of the applied magnetic fields at two points where the magnetization in the substrate radial direction along the magnetization curve are 0. Referring to FIG. 4, the change in the value of the exchange coupling magnetic field with respect to the composition of CoMn and IrMn anti-ferromagnetic layers is shown. A high exchange coupling magnetic field of greater than 796 A/m (10 Oe) was obtained for CoMn at a range of Co amount of 10 atomic % or greater and less than 50 atomic %. For IrMn, a range of Ir amount of 10 atomic % or greater and 30 atomic % or less, is effective.

In order to confirm the presence or absence of a magnetic domain wall formed by the soft magnetic layer of the completed perpendicular magnetic recording medium, a signal having a recording density of 2000 fr/mm (the number of magnetic inversions for every 1 mm) was written onto the perpendicular magnetic recording medium by a MR head using a spin-stand tester. By observing the playback waveform, the presence or absence of spike noise was studied.

Referring to Table 1, the number of spike noises per one track (one revolution) appearing in the playback waveform is shown together with the composition of the anti-ferromagnetic material. It is seen that the generation of spike noise was suppressed for media, in which for CoMn, the Co amount was in the range of 10 atomic % or greater and less than 50 atomic %, and for IrMn, the Ir amount was in the range of 10 atomic % or greater and 30 atomic % or less, and in which a high exchange coupling magnetic field of 796 A/m (10 Oe) or greater was obtained.

TABLE 1

| COMPOSITION | SPIKE NOISE | EXCHANGE COUPLING MAGNETIC FIELD | |
|---|---|---|---|
| Mn | >10 | 0 | 0 |
| Mn-2 ATOMIC % Co | >10 | 0 | 0 |
| Mn-5 ATOMIC % Co | >10 | 79.6 | 1 |
| Mn-7 ATOMIC % Co | 8 | 239 | 3 |
| Mn-10 ATOMIC % Co | 0 | 796 | 10 |
| Mn-15 ATOMIC % Co | 0 | 1190 | 15 |
| Mn-20 ATOMIC % Co | 0 | 1430 | 18 |
| Mn-30 ATOMIC % Co | 0 | 1750 | 22 |
| Mn-40 ATOMIC % Co | 0 | 1270 | 16 |
| Mn-45 ATOMIC % Co | 0 | 955 | 12 |
| Mn-50 ATOMIC % Co | 1 | 716 | 9 |
| Mn-55 ATOMIC % Co | 5 | 239 | 3 |
| Mn-60 ATOMIC % Co | >10 | 0 | 0 |
| Mn-2 ATOMIC % Ir | >10 | 0 | 0 |
| Mn-5 ATOMIC % Ir | >10 | 239 | 3 |
| Mn-7 ATOMIC % Ir | 3 | 398 | 5 |
| Mn-10 ATOMIC % Ir | 0 | 1190 | 15 |
| Mn-15 ATOMIC % Ir | 0 | 1910 | 24 |
| Mn-20 ATOMIC % Ir | 0 | 1590 | 20 |
| Mn-30 ATOMIC % Ir | 0 | 876 | 11 |
| Mn-40 ATOMIC % Ir | 5 | 159 | 2 |
| Mn-45 ATOMIC % Ir | >10 | 79.6 | 1 |
| | [number] | [A/m] | [Oe] |

REFERENCE EXAMPLE 1

A sample for measuring the exchange coupling magnetic field was made in the same manner as Embodiment 1, except that, when forming the soft magnetic layer, a soft magnetic layer of a NiFe alloy was formed using a $Ni_{78}Fe_{22}$ alloy target. The exchange coupling magnetic field was measured. In addition, the anti-ferromagnetic layer was made using several CoMn alloy targets with differing compositions.

Figure 5:
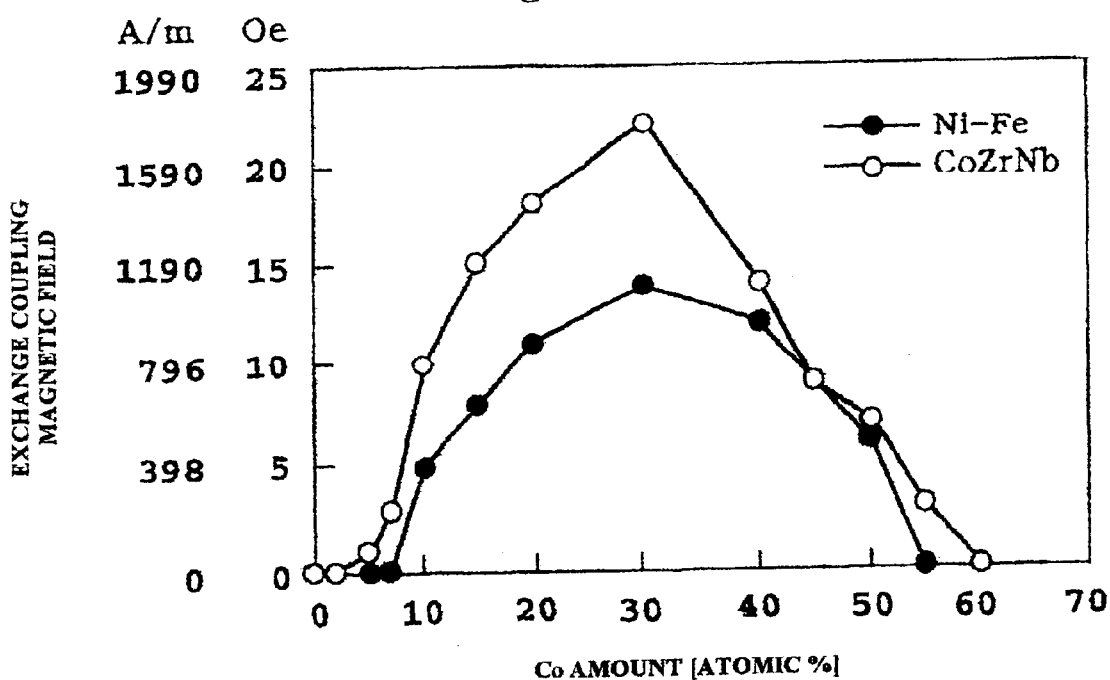
FIG. 5 is a graph showing the change in value of the exchange coupling magnetic field with respect to the composition of CoMn anti-ferromagnetic layer.

Referring to FIG. 5, the change in the value of the exchange coupling magnetic field with respect to the composition (Co content) of the CoMn anti-ferromagnetic layer is shown. For comparison, the change in the value of the exchange coupling magnetic field in the sample (soft magnetic layer of CoZrNb alloy) of Embodiment 1 is also shown. The exchange coupling magnetic field, when using NiFe alloy as the soft magnetic layer, was small compared to when a CoZrNb amorphous alloy was used. This confirms that a higher exchange coupling magnetic field is obtained using a CoZrNb amorphous alloy.

[Embodiment 3]

A sample for measuring the exchange coupling magnetic field was made in the same manner as Embodiment 1, except that the value of the magnetic field applied during film formation of the anti-ferromagnetic layer and the soft magnetic layer was varied, and a $Co_{30}Mn_{70}$ alloy target was used for formation of the anti-ferromagnetic layer.

Figure 6:
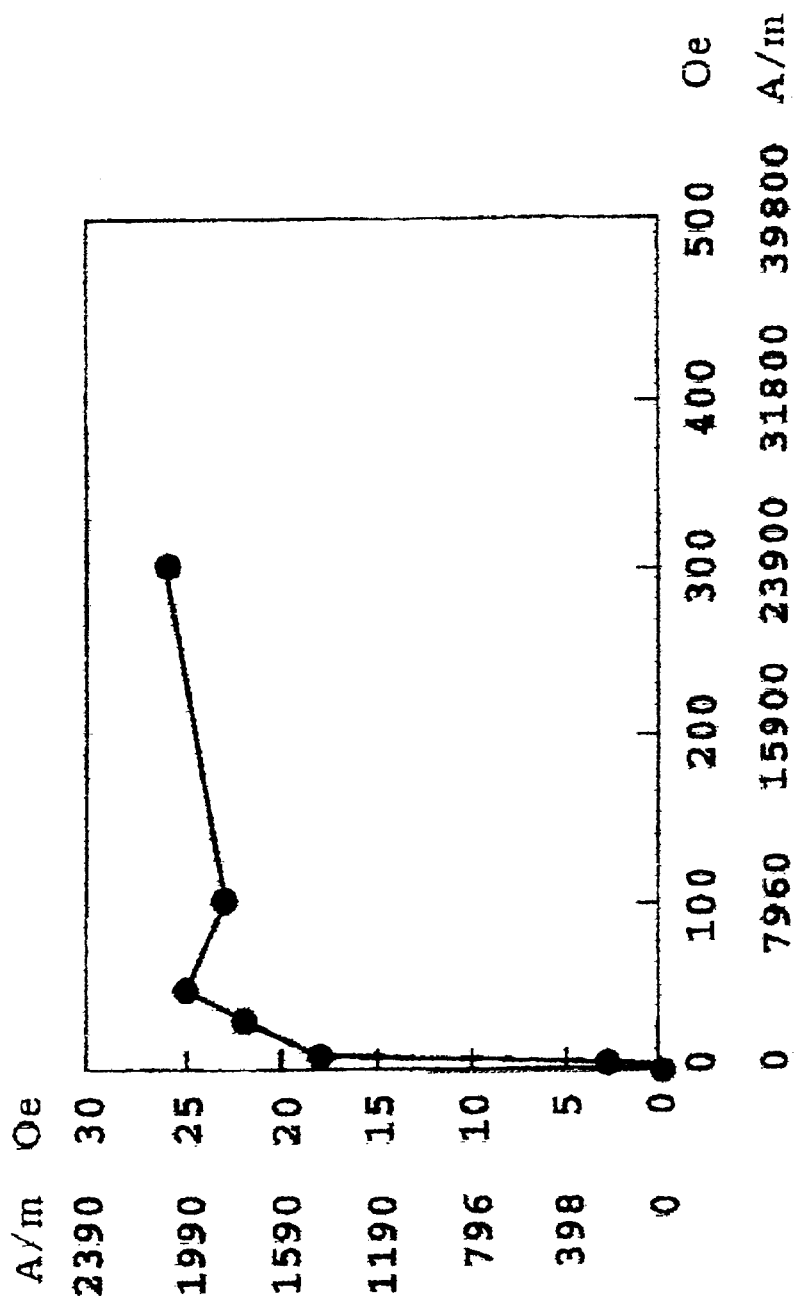
FIG. 6 is a graph showing the relationship between the strength of the magnetic field applied during film formation and the strength of the exchange coupling magnetic field of the sample.

Referring to FIG. 6, the relationship between the strength of the magnetic field applied during film formation and the strength of the exchange coupling magnetic field of the resulting sample is shown. It is seen that an adequate exchange coupling magnetic field is obtained when the magnetic field applied during film formation is 796 A/m (10 Oe) or greater. With the device used, the plasma discharge during sputtering became unstable when the applied magnetic field was 23900 A/m (300 Oe) or greater, and film formation could not be conducted.

As described above, according to the present invention, by using a CoMn alloy with at least a Co amount of 10 atomic % or greater and 50 atomic % or less or an IrMn alloy with at least an Ir amount of 10 atomic % or greater and 30 atomic % or less between a non-magnetic substrate and a soft magnetic layer of a perpendicular magnetic recording medium, the magnetization of the soft magnetic layer is fixed by exchange coupling with the anti-ferromagnetic layer. The formation of a magnetic domain wall of the soft magnetic layer (backing layer) which acts as a noise source is suppressed. It was also clear that an even greater effect could be obtained by using an amorphous Co alloy as the soft magnetic layer. In addition, when using the anti-ferromagnetic layer of the present invention, heat treatment after film formation is not necessary. The needed exchange coupling is achieved by an extremely simple manufacturing method of applying a magnetic field of 796 A/m (10 Oe) or greater during formation of the anti-ferromagnetic layer and soft magnetic layer. As a result, the present invention is also very well suited for mass production.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A perpendicular magnetic recording medium, comprising:
   a non-magnetic substrate;
   an anti-ferromagnetic layer on said non-magnetic substrate;
   said anti-ferromagnetic layer consisting of a Mn alloy containing Co at 10 atomic % or greater and 50 atomic % or less;
   a soft magnetic layer on said anti-ferromagnetic layer; and
   a magnetic recording layer on said soft magnetic layer.

2. A perpendicular magnetic recording medium according to claim 1, further comprising a protective layer on said magnetic recording layer.

3. A perpendicular magnetic recording medium according to claim 2, further comprising liquid lubricant layer on said protective layer.

4. A perpendicular magnetic recording medium comprising:
   a nonmagnetic substrate;
   an anti-ferromagnetic layer on said non-magnetic substrate;
   said anti-ferromagnetic layer consisting of a Mn alloy containing Ir at 10 atomic % or greater and 30 atomic % or less;
   a soft magnetic layer on said anti-ferromagnetic layer; and
   a hard magnetic layer on said soft magnetic layer.

5. A perpendicular magnetic recording medium according to claim 4, further comprising a protective layer on said hard magnetic layer.

6. A perpendicular magnetic recording medium according to claim 5, further comprising a liquid lubricant layer on said protective layer.

7. A perpendicular magnetic recording medium as described in claim 1, wherein said soft magnetic layer is an amorphous alloy containing Co.

8. A perpendicular magnetic recording medium according to claim 4 wherein said soft magnetic layer is an amorphous alloy containing Co.

9. A perpendicular magnetic recording medium according to claim 4, wherein a number of spike noises per one track played back from said perpendicular recording medium is equal to 0.

* * * * *